United States Patent
Milliorn

(10) Patent No.: US 10,902,054 B1
(45) Date of Patent: *Jan. 26, 2021

(54) AUTOMATED BACKGROUND CHECK VIA VOICE PATTERN MATCHING

(71) Applicant: Securus Technologies, Inc., Carrollton, TX (US)

(72) Inventor: Danny C. Milliorn, Waxahachie, TX (US)

(73) Assignee: Securas Technologies, Inc., Carrollton, TX (US)

( * ) Notice: Subject to any disclaimer, the term of this patent is extended or adjusted under 35 U.S.C. 154(b) by 292 days.

This patent is subject to a terminal disclaimer.

(21) Appl. No.: 15/926,718

(22) Filed: Mar. 20, 2018

Related U.S. Application Data

(63) Continuation of application No. 14/556,695, filed on Dec. 1, 2014, now Pat. No. 9,922,048.

(51) Int. Cl.
- *G06F 16/00* (2019.01)
- *G06F 16/583* (2019.01)
- *G06K 9/00* (2006.01)
- *G06Q 50/26* (2012.01)

(52) U.S. Cl.
CPC ..... *G06F 16/5838* (2019.01); *G06K 9/00275* (2013.01); *G06K 9/00295* (2013.01); *G06Q 50/26* (2013.01)

(58) Field of Classification Search
CPC ................ G06F 16/5838; G06Q 50/26; G06K 9/00275; G06K 9/00295; G06K 9/00288; G06K 9/6232; G06K 9/00677; G06T 7/20; G10L 17/26

See application file for complete search history.

(56) References Cited

U.S. PATENT DOCUMENTS

| | | | |
|---|---|---|---|
| 4,586,195 | A | 4/1986 | DeGeorge et al. |
| 4,843,377 | A | 6/1989 | Fuller et al. |
| 5,319,702 | A | 6/1994 | Kitchin et al. |
| 5,623,539 | A | 4/1997 | Bassenyemukasa et al. |

(Continued)

OTHER PUBLICATIONS

Robert L. Mitchell, "Gotcha! FBI launches new biometric systems to nail criminals," Computerworld, Dec. 19, 2013, 3 pages, available at https://www.computerworld.com/article/2486963/security0/gotcha-fbi-launches-new-biometric-systems-to-nail-criminals.html.

(Continued)

*Primary Examiner* — Anh Ly
(74) *Attorney, Agent, or Firm* — Fogarty LLP

(57) ABSTRACT

Embodiments use electronic speech samples of detainees and automatically scan electronic speech sample databases to detect when a detainee has a criminal record and to alert controlled-environment facility personnel to that record. An electronic speech sample of the detainee is captured during booking or at another time. The electronic speech sample is compared to a database of electronic speech samples of individuals with criminal records. If the electronic speech sample matches an existing electronic speech sample in the database, then information associated with the matching electronic speech sample is provided to the controlled-environment facility personnel. The information is analyzed to identify key issues, such as active warrants. The controlled-environment facility personnel are alerted to any such key information.

19 Claims, 4 Drawing Sheets

(56) References Cited

U.S. PATENT DOCUMENTS

| | | | |
|---|---|---|---|
| 5,638,486 A | 6/1997 | Wang et al. | |
| 5,655,013 A | 8/1997 | Gainsboro | |
| 5,732,184 A | 3/1998 | Chao et al. | |
| 5,796,811 A | 8/1998 | McFarlen | |
| 5,805,674 A | 9/1998 | Anderson, Jr. | |
| 5,805,685 A | 9/1998 | McFarlen | |
| 5,839,103 A | 11/1998 | Mammone et al. | |
| 5,883,945 A | 3/1999 | Richardson, Jr. et al. | |
| 5,913,196 A | 6/1999 | Talmor et al. | |
| 5,926,533 A | 7/1999 | Gainsboro | |
| 6,054,928 A | 4/2000 | Lemelson et al. | |
| 6,064,963 A | 5/2000 | Gainsboro | |
| 6,081,780 A | 6/2000 | Lumelsky | |
| 6,101,468 A | 8/2000 | Gould et al. | |
| 6,141,406 A | 10/2000 | Johnson | |
| 6,163,604 A | 12/2000 | Baulier et al. | |
| 6,246,759 B1 | 6/2001 | Greene et al. | |
| 6,347,146 B1 | 2/2002 | Short et al. | |
| 6,389,397 B1 | 5/2002 | Otto | |
| 6,505,160 B1 | 1/2003 | Levy et al. | |
| 6,510,415 B1 | 1/2003 | Talmor et al. | |
| 6,519,561 B1 | 2/2003 | Farrell et al. | |
| 6,542,583 B1 | 4/2003 | Taylor | |
| 6,560,323 B2 | 5/2003 | Gainsboro | |
| 6,607,136 B1 | 8/2003 | Atsmon et al. | |
| 6,611,583 B1 | 8/2003 | Gainsboro | |
| 6,633,655 B1 | 10/2003 | Hong et al. | |
| 6,665,376 B1 | 12/2003 | Brown et al. | |
| 6,698,653 B1 | 3/2004 | Diamond et al. | |
| 6,760,701 B2 | 7/2004 | Sharma et al. | |
| 6,859,528 B1 | 2/2005 | Welte | |
| 6,895,084 B1 | 5/2005 | Saylor et al. | |
| 6,920,209 B1 | 7/2005 | Gainsboro | |
| 7,024,426 B2 | 4/2006 | Black et al. | |
| 7,050,608 B2 | 5/2006 | Dobashi | |
| 7,079,637 B1 | 7/2006 | McNitt et al. | |
| 7,106,843 B1 | 9/2006 | Gainsboro et al. | |
| 7,136,458 B1 | 11/2006 | Zellner et al. | |
| 7,278,028 B1* | 10/2007 | Hingoranee | G06F 21/32 |
| | | | 713/186 |
| 7,376,557 B2 | 5/2008 | Specht et al. | |
| 7,403,766 B2 | 7/2008 | Hodge | |
| 7,529,357 B1* | 5/2009 | Rae | H04M 3/38 |
| | | | 370/261 |
| 7,698,566 B1 | 4/2010 | Stone | |
| 7,805,457 B1* | 9/2010 | Viola | G06Q 50/26 |
| | | | 707/769 |
| 7,853,243 B2 | 12/2010 | Hodge | |
| 7,860,222 B1 | 12/2010 | Sidler et al. | |
| 7,860,722 B1 | 12/2010 | Chow | |
| 7,889,847 B2 | 2/2011 | Gainsboro | |
| 8,028,249 B2 | 5/2011 | Ramirez | |
| 8,180,027 B1 | 5/2012 | Magnuson et al. | |
| 8,340,260 B1 | 12/2012 | Rae et al. | |
| 8,467,381 B1 | 6/2013 | Keiser et al. | |
| 8,484,084 B2 | 7/2013 | Altberg et al. | |
| 8,558,663 B2 | 10/2013 | Newman et al. | |
| 8,712,110 B2 | 4/2014 | Eckhoff et al. | |
| 8,855,280 B1* | 10/2014 | Passe | H04M 3/2281 |
| | | | 379/126 |
| 8,886,663 B2 | 11/2014 | Gainsboro et al. | |
| 9,055,167 B1 | 6/2015 | Keiser et al. | |
| 9,300,790 B2 | 3/2016 | Gainsboro et al. | |
| 9,386,146 B2 | 7/2016 | Gainsboro et al. | |
| 9,621,713 B1 | 4/2017 | Gainsboro et al. | |
| 9,800,721 B2 | 10/2017 | Gainsboro et al. | |
| 2001/0036821 A1 | 11/2001 | Gainsboro et al. | |
| 2001/0056349 A1 | 12/2001 | St. John | |
| 2002/0094072 A1 | 7/2002 | Evans et al. | |
| 2002/0095389 A1 | 7/2002 | Gaines | |
| 2003/0026413 A1 | 2/2003 | Brandt et al. | |
| 2003/0095389 A1 | 5/2003 | Samant et al. | |
| 2003/0126470 A1* | 7/2003 | Crites | G06F 21/55 |
| | | | 379/114.14 |
| 2003/0147519 A1 | 8/2003 | Jain et al. | |
| 2003/0220796 A1 | 11/2003 | Aoyama et al. | |
| 2003/0228007 A1 | 12/2003 | Kurosaki | |
| 2004/0022382 A1 | 2/2004 | Sweeney et al. | |
| 2004/0122668 A1 | 6/2004 | Marino et al. | |
| 2004/0125124 A1 | 7/2004 | Kim et al. | |
| 2004/0186724 A1 | 9/2004 | Morin | |
| 2004/0213437 A1 | 10/2004 | Howard et al. | |
| 2004/0240631 A1 | 12/2004 | Broman et al. | |
| 2004/0245330 A1 | 12/2004 | Swift et al. | |
| 2004/0249650 A1 | 12/2004 | Freedman et al. | |
| 2005/0010409 A1 | 1/2005 | Hull et al. | |
| 2005/0018660 A1 | 1/2005 | Hayashi | |
| 2005/0032527 A1 | 2/2005 | Sheha et al. | |
| 2005/0043014 A1 | 2/2005 | Hodge | |
| 2005/0063522 A1 | 3/2005 | Kim et al. | |
| 2005/0069095 A1 | 3/2005 | Fellenstein et al. | |
| 2005/0141678 A1* | 6/2005 | Anders | H04L 63/30 |
| | | | 379/67.1 |
| 2005/0144015 A1 | 6/2005 | Agapi et al. | |
| 2005/0175159 A1 | 8/2005 | Cooper et al. | |
| 2005/0185779 A1 | 8/2005 | Toms | |
| 2005/0190897 A1 | 9/2005 | Eberle et al. | |
| 2005/0216555 A1* | 9/2005 | English | G06Q 50/18 |
| | | | 709/204 |
| 2005/0271251 A1 | 12/2005 | Russell et al. | |
| 2006/0029193 A1 | 2/2006 | Timmins et al. | |
| 2006/0115158 A1 | 6/2006 | Sunshine et al. | |
| 2006/0143559 A1 | 6/2006 | Spielberg et al. | |
| 2006/0149558 A1 | 7/2006 | Kahn et al. | |
| 2006/0270465 A1 | 11/2006 | Lee et al. | |
| 2006/0285665 A1 | 12/2006 | Wasserblat et al. | |
| 2006/0285667 A1 | 12/2006 | Hodge | |
| 2006/0286969 A1 | 12/2006 | Talmor et al. | |
| 2007/0003027 A1 | 1/2007 | Brandt | |
| 2007/0041545 A1* | 2/2007 | Gainsboro | H04M 3/36 |
| | | | 379/188 |
| 2007/0041644 A1 | 2/2007 | Kim et al. | |
| 2007/0055398 A1 | 3/2007 | Steinberg | |
| 2007/0071206 A1 | 3/2007 | Gainsboro et al. | |
| 2007/0086600 A1 | 4/2007 | Boesen | |
| 2007/0185715 A1 | 8/2007 | Wei et al. | |
| 2007/0213983 A1 | 9/2007 | Ramsey | |
| 2007/0219800 A1 | 9/2007 | Hymel et al. | |
| 2007/0223683 A1 | 9/2007 | Pearson | |
| 2007/0226762 A1 | 9/2007 | Girgis et al. | |
| 2007/0244702 A1 | 10/2007 | Kahn | |
| 2007/0280436 A1 | 12/2007 | Rajakumar | |
| 2008/0000966 A1* | 1/2008 | Keiser | G06Q 10/10 |
| | | | 235/382 |
| 2008/0013801 A1 | 1/2008 | Reed et al. | |
| 2008/0033826 A1 | 2/2008 | Maislos et al. | |
| 2008/0046241 A1 | 2/2008 | Osburn et al. | |
| 2008/0069327 A1 | 3/2008 | Kingsley et al. | |
| 2008/0084975 A1 | 4/2008 | Schwartz | |
| 2008/0118042 A1 | 5/2008 | Hogg | |
| 2008/0159511 A1 | 7/2008 | Keohane et al. | |
| 2008/0178278 A1 | 7/2008 | Grinstein et al. | |
| 2008/0195387 A1 | 8/2008 | Zigel et al. | |
| 2008/0198978 A1 | 8/2008 | Olligschlaeger | |
| 2008/0201143 A1* | 8/2008 | Olligschlaeger | H04M 3/2281 |
| | | | 704/235 |
| 2008/0235283 A1 | 9/2008 | Turnball et al. | |
| 2008/0300877 A1 | 12/2008 | Gilbert et al. | |
| 2008/0304643 A1 | 12/2008 | Hodge | |
| 2009/0046840 A1 | 2/2009 | Luneau et al. | |
| 2009/0046841 A1 | 2/2009 | Hodge | |
| 2009/0119106 A1 | 5/2009 | Rajakumar et al. | |
| 2009/0129627 A1 | 5/2009 | Levy et al. | |
| 2009/0152343 A1 | 6/2009 | Carter et al. | |
| 2009/0207987 A1 | 8/2009 | Ryan | |
| 2009/0228278 A1 | 9/2009 | Huh et al. | |
| 2009/0262975 A1 | 10/2009 | Rhoads et al. | |
| 2009/0275365 A1 | 11/2009 | Lee et al. | |
| 2010/0027767 A1 | 2/2010 | Gilbert | |
| 2010/0106501 A1 | 4/2010 | Miki et al. | |
| 2010/0226525 A1 | 9/2010 | Levy et al. | |
| 2010/0235341 A1 | 9/2010 | Bennett | |
| 2010/0246807 A1 | 9/2010 | Kemmochi et al. | |

(56) References Cited

U.S. PATENT DOCUMENTS

| | | |
|---|---|---|
| 2010/0329568 A1 | 12/2010 | Gamliel et al. |
| 2011/0013003 A1 | 1/2011 | Thompson et al. |
| 2011/0040191 A1 | 2/2011 | Kyle et al. |
| 2011/0055256 A1 | 3/2011 | Phillips et al. |
| 2011/0072350 A1 | 3/2011 | Bachtiger |
| 2011/0153596 A1 | 6/2011 | Parkar et al. |
| 2011/0153622 A1 | 6/2011 | Bhattal et al. |
| 2011/0082874 A1 | 8/2011 | Gainsboro et al. |
| 2011/0228922 A1 | 9/2011 | Dhara et al. |
| 2011/0286585 A1 | 11/2011 | Hodge |
| 2011/0288866 A1 | 11/2011 | Rasmussen |
| 2011/0301940 A1 | 12/2011 | Hon-Anderson et al. |
| 2012/0054202 A1 | 3/2012 | Rajakumar |
| 2012/0198317 A1 | 8/2012 | Eppolito |
| 2012/0245936 A1 | 9/2012 | Treglia |
| 2012/0263285 A1 | 10/2012 | Rajakumar et al. |
| 2012/0281058 A1 | 11/2012 | Laney et al. |
| 2012/0306619 A1 | 12/2012 | Longo |
| 2013/0144863 A1* | 6/2013 | Mayer ............... G06F 21/6218 707/711 |
| 2013/0148798 A1 | 6/2013 | Ellsworth et al. |
| 2013/0195316 A1 | 8/2013 | Bataller et al. |
| 2013/0216029 A1 | 8/2013 | Pawlewski |
| 2013/0244784 A1 | 9/2013 | Assa |
| 2013/0263227 A1* | 10/2013 | Gongaware ............ H04L 63/08 726/4 |
| 2014/0018059 A1* | 1/2014 | Noonan ............... H04W 4/021 455/419 |
| 2014/0040409 A1 | 2/2014 | McDowell et al. |
| 2014/0104034 A1 | 4/2014 | Ambrefe et al. |
| 2014/0254777 A1 | 9/2014 | Olligschlaeger |
| 2014/0267547 A1* | 9/2014 | Torgersrud ............ H04N 7/141 348/14.02 |
| 2014/0344566 A1 | 11/2014 | Stephenson et al. |
| 2014/0348358 A1 | 11/2014 | Kraemer |
| 2015/0055763 A1 | 2/2015 | Guerra et al. |
| 2015/0081742 A1 | 3/2015 | Roys |
| 2015/0133092 A1 | 5/2015 | Shaffer et al. |
| 2015/0172439 A1 | 6/2015 | Yagey |
| 2015/0201081 A1 | 7/2015 | Hodge et al. |
| 2015/0201083 A1 | 7/2015 | Olligschlaeger |
| 2015/0271321 A1 | 9/2015 | Gainsboro et al. |
| 2015/0281433 A1 | 10/2015 | Gainsboro et al. |
| 2015/0381801 A1 | 12/2015 | Rajakumar et al. |
| 2016/0070809 A1 | 3/2016 | Rathus |
| 2016/0364009 A1 | 12/2016 | Lemberger |

OTHER PUBLICATIONS

Zeynep Inanoglu, et al., "Emotive Alert: HMM-Based Emotion Detection in Voicemail Messages," MIT Media Lab Technical Report No. 585, Jan. 2005, 3 pages, which appeared in Intelligent user Interfaces (IUI 05), 2005, San Diego, California, USA.

R. Cowie, et al., "Emotion Recognition in Human Computer Interaction," IEEE, Signal Processing Magazine, vol. 18, Issue: 1, Jan. 2001, pp. 32-80.

Peter J. Durston, et al., "OASIS Natural Language Call Steering Trial," In Proceedings Eurospeech, pp. 1323-1326, Aalborg, Denmark., 2001.

Raul Fernandez, "A Computational Model for the Automatic Recognition of Affect in Speech," PhD thesis, MIT Media Lab, 2004, 284 pages.

Holger Quast, "Absolute Perceived Loudness of Speech," Joint Symposium on Neural Computation, 2000, 1 page.

Meredith Ringel, et al., "Automated Message Prioritization: Making Voicemail Retrieval More Efficient," CHI, 2002, 2 pages.

Steve Whittaker, et al., "All talk and all action: Strategies for managing voicemail messages," CHI, 1998, 2 pages.

Pierre D. Wellner, et al., "Conference Scribe: Turning Conference Calls into Documents," Jan. 2001, pp. 1-9, published in System Sciences, 2001, proceedings of the 34th Annual Hawaii International Conference on Date of Conference: Jan. 6-6, 2001, AT&T Labs.—Research, Red Bank, NJ, USA.

J.R. Rohlicek, et al., "Gisting conversational speech," published in Acoustics, Speech, and Signal Processing, 1992. ICASSP-92., pp. 113-116, vol. 2, 1992 IEEE International Conference Date of Conference: Mar. 23-26, 1992, BBN Systems & Technologies, Cambridge, MA, USA.

Hiawatha Bray, "Computer programs that react to speech gain real-world use", Boston Globe, Jan. 16, 2006, 3 pages.

Anmol Madan, et al., "Voices of Attraction," MIT Media Laboratory, Technical Note No. 584, Sep. 2004, 3 pages.

Raul Fernandez, et al., "Classical and Novel Discriminant Features for Affect Recognition from Speech," Interspeech 2005, 4 pages.

Doug Reynolds, et al., "EARS RT03S Diarization," May 20, 2003, 9 pages.

Ron Caneel, et al., "Social Signaling in Decision Making," Massachusetts Institute of Technology, Jun. 2005, 60 pages.

Patrick Nguyen, et al., "PSTL's Speaker Diarization," Panasonic Speech Technology Laboratory (prior to Feb. 27, 2006), 26 pages.

Alvin F. Martin, et al., "Speaker Recognition in a Multi-Speaker Environment," National Institute of Standards and Technology (prior to Feb. 27, 2006), 4 pages.

Feng Yu, et al. "Emotion Detection From Speech to Enrich Multimedia Content," Microsoft Research China (prior to Feb. 27, 2006), 4 pages.

* cited by examiner

| | ARRESTEE 201 | FACIAL RECOGNITION 203 | |
|---|---|---|---|
| | BOOKING INFORMATION | MATCHED RECORD | |
| | 202 210 | 204 | 211 / 205 |
| NAME | NAME 1 | NAME 2 | |
| ALIASES | | NAME 3 | |
| DOB | | | |
| WARRANTS | | NONE | 206 |
| ARRESTS | | JURISDICTION/CRIME/DATE | 208 |
| CONVICTIONS | | JURISDICTION/VERDICT/SENTENCE | 209 |
| PAROLE STATUS | | PAROLE OFFICER CONTACT INFO | 207 |

FIG. 2

AUTOMATED BACKGROUND CHECK VIA VOICE PATTERN MATCHING

CROSS-REFERENCE TO RELATED APPLICATION

This is a continuation of, and claims benefit of, U.S. patent application Ser. No. 14/556,695, filed Dec. 1, 2014 and issued as U.S. Pat. No. 9,922,048 on Mar. 20, 2018, which is hereby incorporated herein by reference.

BACKGROUND

Law enforcement personnel, particularly jailers and officers within short-term detention facilities, routinely run criminal background checks on detainees to identify prior arrests and convictions. These searches are conducted using information provided by detainee, such as their name, social security number, driver's license number, and the like. Often, detainees will use an alias instead of providing their real name. As a result, detainees with criminal records may be released at the end of a short term stay in a holding tank or may be bonded out without being detected.

SUMMARY

Embodiments use pictures of detainees and automatically scan image databases to detect when a detainee has a criminal record and to alert facility personnel to that record. The image detection system does not require special investigator action, but may run automatically as part of a normal booking procedure. If the detainee has provided a false name or other incorrect information, the facial recognition system can still identify fugitives or parole violators that have been incarcerated for crimes unrelated to their prior record.

In one embodiment, an electronic image of a detainee is captured using a camera system in a controlled-environment facility. The electronic image of the detainee is captured as part of an intake process in the controlled-environment facility or when the detainee uses a communication or visitation terminal in the controlled-environment facility. The electronic image of the detainee is compared to a database of stored images that are associated with individuals with known criminal records. The electronic image of the detainee may be compared to the database of stored images using an application running on a processor, such as a workstation, server, or computer, located at the controlled-environment facility or at a remote facility. Matches are identified between the electronic image and a matching stored image in the database of stored images. The electronic image of the detainee and the stored images may comprise pictures of faces that are compared using a facial recognition application. Criminal record information associated with the matching stored image is identified and then provided to personnel at the controlled-environment facility. Controlled-environment facility personnel are alerted when at least one difference is detected between the criminal record information and the detainee's record at the controlled-environment facility. The differences may be highlighted on a display presented to the controlled-environment facility personnel. For example, if an active warrant is found in the criminal record information and is not noted in the detainee record at the controlled-environment facility, then an alert may be generated.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processors, wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
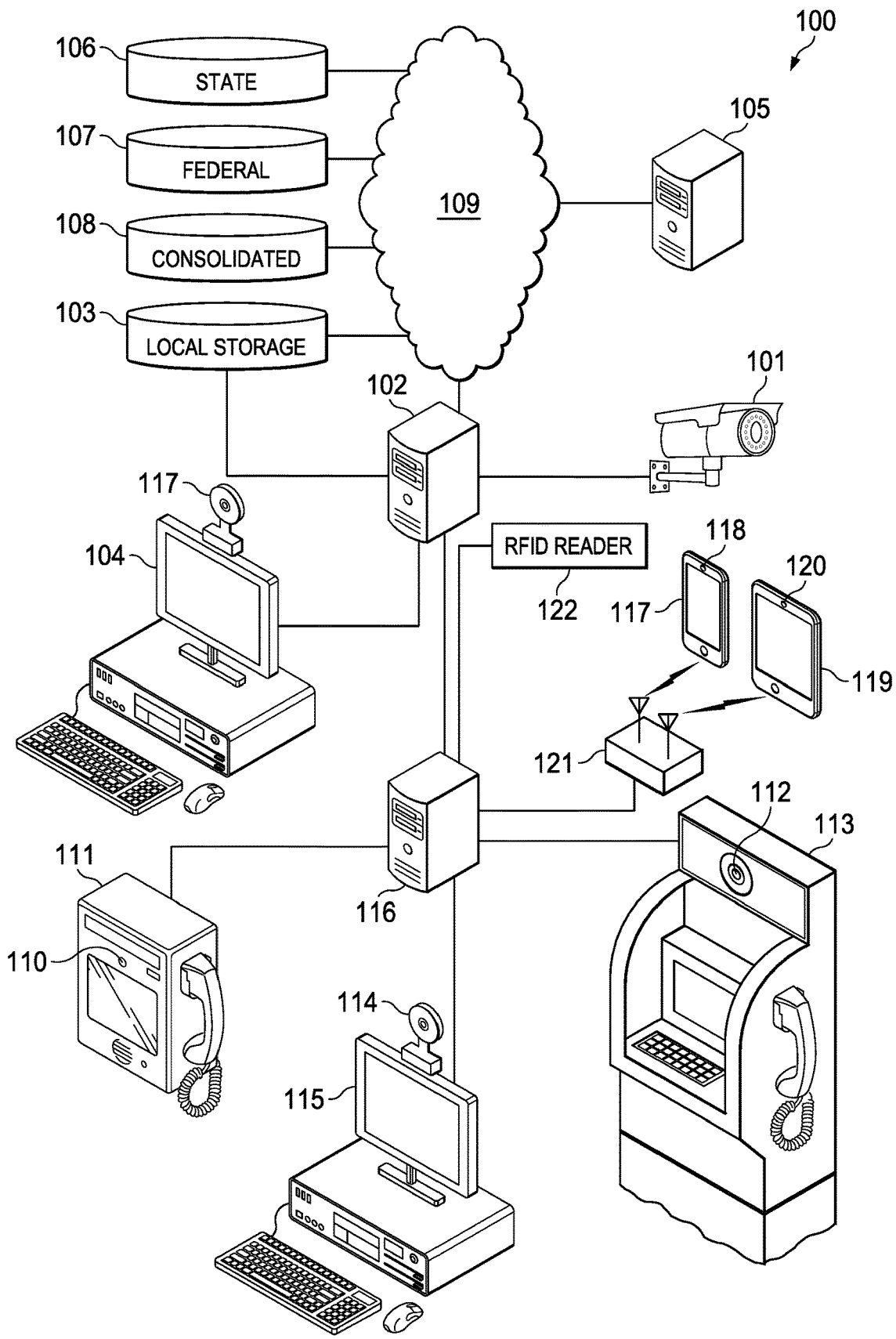
Figure 3:
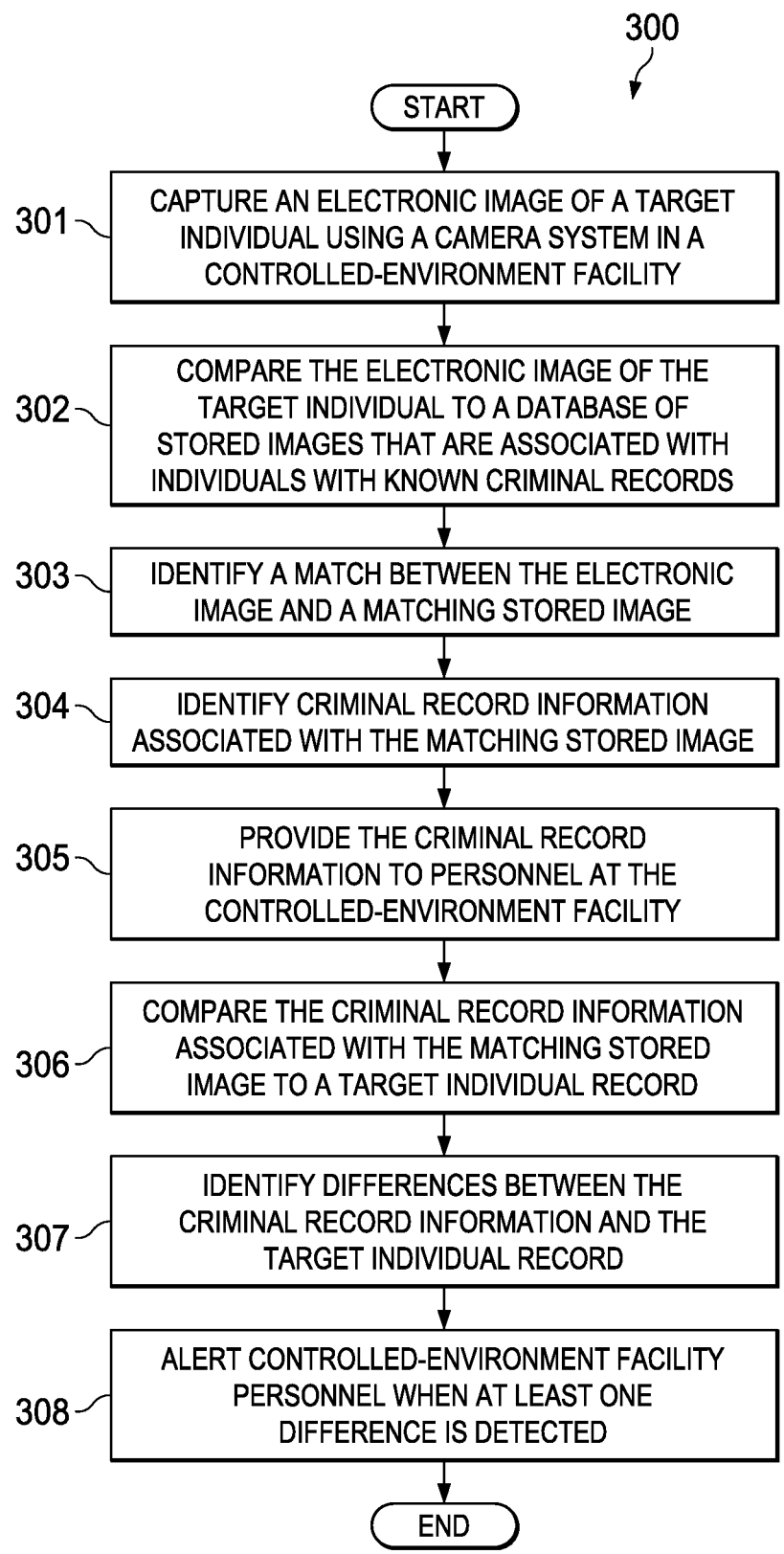
Figure 4:
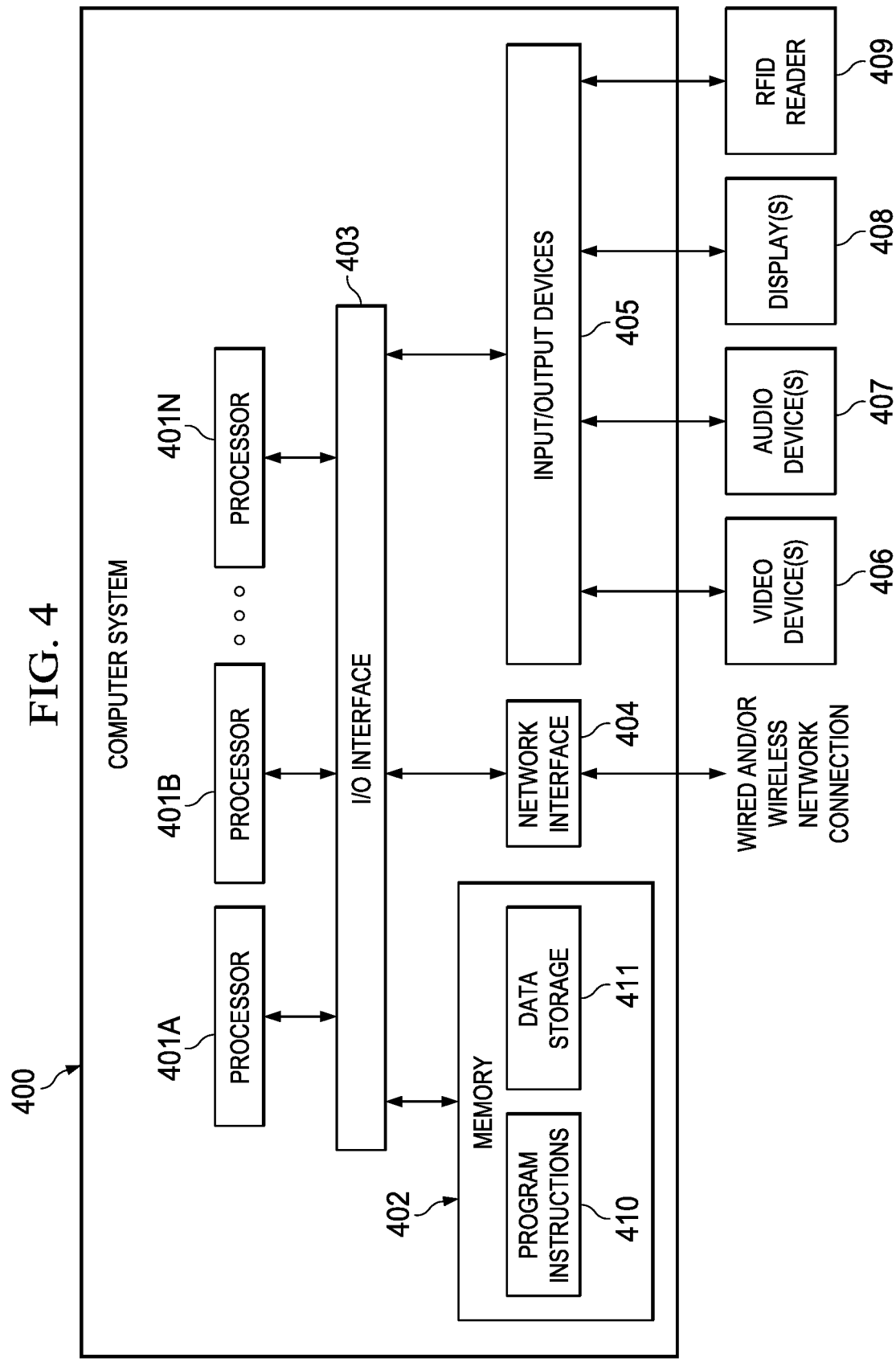

Having thus described the invention in general terms, reference will now be made to the accompanying drawings, which are not necessarily drawn to scale, and wherein:

FIG. 1 is a high level block diagram illustrating an example embodiment of a system for conducting automated background checks using facial recognition techniques;

FIG. 2 illustrates information displayed to a booking officer according to an example embodiment;

FIG. 3 is a flowchart 300 of a method for automatically identifying records associated with residents of a controlled-environment facility; and FIG. 4 is a block diagram of a computer system, device, or station configured to implement various techniques disclosed herein, according to some embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art. One skilled in the art may be able to use the various embodiments of the invention.

Numerous types of controlled-environment facilities exist and individuals may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the embodiments discussed below, a controlled-environment facility may be referred to as a correctional facility, jail or prison, and its residents may be referred to as inmates, arrestees, or detainees. In many cases, technologies that are used outside of correctional facilities are not immediately applicable to the correctional environment without significant changes and modifications. Moreover, correctional facilities may have specific needs that are not particularly relevant outside of those environments. However, it should be understood, that the systems and methods described herein may be similarly applicable to other types of controlled-environment facilities and their respective residents.

Elements of the invention may be used, for example, in connection with booking arrestees at a police station. When a person is arrested and booked at a local police facility, a picture of the arrestee is captured and then compared against a database of pictures of known and/or unknown individuals. If the arrestee's picture matches any of the pictures stored in the database, then information associated with the individual in the matched picture is provided to the booking officer. The booking officer may then evaluate whether the stored information (e.g., name, date of birth, address, parole status, etc.) conflicts with information provided by the arrestee. If the stored picture matches the arrestee, the booking officer may choose to add any of the stored information to the arrestee's booking record. If the arrestee has given a false name, the booking officer will still be able to retrieve background information on the arrestee using the picture.

The facial recognition process may be run again anytime after booking to update and/or verify the arrestee's record. For example, an officer or guard processing incoming inmates at a correctional facility may capture a picture of an incoming inmate and use that picture to determine if the records received with the inmate are correct and/or if they match any other records. By using facial recognition matching at this later time, the officer at the correctional facility may identify additional warrants, convictions, or other information that was not yet known or recorded when the original facial recognition process was run at booking.

FIG. 1 is a high level block diagram illustrating an example embodiment of a system 100 for conducting automated background checks using facial recognition techniques. Camera 101 is used to capture pictures of a target individual, such as an arrestee, inmate, parolee, etc. Camera 101 may capture video or one or more still images of the target individual. Camera 101 may capture such images overtly or covertly depending upon, for example, the location of the camera and whether the camera is in the open or camouflaged. Accordingly, both posed and candid images may be captured by camera 101.

The images captured by camera 101 are provided to image server 102 and then saves to a local image database on storage 103. A local user, such as a booking officer, inmate intake processing officer, guard, or investigator, uses workstation 104 to access and view images of the target individual. For example, a booking officer may use workstation 104 to enter arrestee information, such as the name, date of birth, and address, provided by the arrestee. The booking officer captures a picture of the arrestee using camera 101 and views the image on workstation 104. The arrestee's picture is provided to a facial recognition application that compares the image to a database of known and/or unknown individuals.

The facial recognition application may run on a local network node, such as image server 102 or workstation 104. The image database may be stored locally, such as a database on image server 102, workstation 104, or local storage 103. In one embodiment, the facial recognition application automatically identifies images in the image database that match the arrestee's image. The facial recognition application may use any appropriate facial features to match images. For example, the facial recognition algorithms may identify facial features by extracting features (e.g., eyes, nose, mouth, cheekbones, jaw, etc.) from an image of the target individual's face and then analyze the relative position, size and/or shape of those features. This information may then be used to search for images with matching features.

Records with matching images are displayed to the booking officer on workstation 104. The booking officer may then determine whether the matched records are associated with the arrestee and/or whether the matched records comprise relevant information. This may allow the booking officer to determine, for example, whether the arrestee has given a false name either during the current arrest or during a past arrest, whether there are active warrants for the arrestee, the arrestee has a criminal record, and/or the arrestee is violating a current parole status.

FIG. 2 illustrates information displayed to a booking officer according to an example embodiment. Column 201 comprises information provided by the arrestee during a current arrest and booking process, including the picture 202 that is being analyzed by the facial recognition application. Column 203 comprises information associated with picture 204 that was identified as a match to picture 202 by the facial recognition application. Additional information 205 corresponding to the matched picture 204, such as names, aliases, date of birth, warrants, arrests, convictions, parole status, etc., is also displayed.

The booking officer may evaluate the information provided in the matched record 203 and determine if it corresponds to the arrestee—e.g., determine if the pictures 202, 204 match. If the matched record does correspond to the arrestee, the booking officer may determine whether any of the information 205 is relevant, such as whether there are any outstanding warrants 206, if the arrestee is on parole 207, or if the arrestee has previously been arrested 208 or convicted 209 of other crimes.

The facial recognition application may be used to identify attempts by the individual to hide their identity. For example, even if the name 210 provided by the arrestee does not match the name or aliases 211 in prior records, the related records 203 may still be found because facial recognition does not rely on the information provided by the arrestee.

Referring to FIG. 1, the facial recognition application may run locally at a controlled-environment facility, such as on a local server 102 or workstation 104. The facial recognition application may use a local image database, such as a database on local storage 103. Alternatively or additionally, the facial recognition application may run on a remote server 105 in a central location or at a remote controlled-environment facility. In addition to the local image database on storage 103, the facial recognition application may use one or more image databases stored on remote databases 106-108, such as databases for particular local, state, or federal jurisdictions or a consolidated database comprising image records from several facilities or jurisdictions. Databases 106-108 may be accessed via a public data network 109, such as the Internet. Additionally, server 105 at a remote facility may access local storage 103 via network 109.

Although the example above refers to a booking or intake process, it will be understood that the facial recognition application may be used at any time and at any location within a controlled-environment facility. Any number of cameras 101 may be deployed within the controlled-environment facility. Instead of running the facial recognition application only during an initial contact, residents of a controlled-environment facility may be evaluated routinely at predetermined times or following predetermined events. For example, resident images may be captured in a dining hall, medical clinic, workshop, exercise yard, visitation area, etc.

In addition to camera 101, other image capture devices may be used with the facial recognition application, such as a camera 110 on communication terminal 111, camera 112 on video visitation terminal 113, or camera 114 on computer terminal 115. Each time a resident uses one of these devices, an image may be captured and a search for related records conducted. Images captured by devices 111, 113, 115 may be provided to a communication server 116, which in turn passes the images to image server 102 for further processing.

In addition to the fixed-location cameras noted above, images may also be captured using mobile devices. Most mobile telephones or smartphones 117 have an embedded camera 118. Similarly, most tablet devices 119 also include a camera 120. Many smartphone 117 and tablet devices 119 have both front- and rear-facing cameras. A smartphone 117 or tablet 119 may take pictures of the person (e.g., resident or staff member) using the device using a front-facing camera. Alternatively, a staff member may overtly or covertly take pictures of residents using the rear-facing camera on a mobile device. In addition to mobile communication devices such as smartphone 117 or tablet 119, any other mobile or portable device may be used to capture images of persons of interest. For example, wearable technology, such as Google Glass eyewear, or other camera-equipped devices may be used to overtly or covertly take pictures of residents or other individuals.

The images captured by a mobile or portable device may be forwarded wirelessly to communications server 116 using any appropriate wireless local area network (WLAN) protocol, such as IEEE 802.11 WiFi, IEEE 802.15.4 ZigBee, Bluetooth, or other wireless data transfer protocol. Smartphone 117, tablet 119 or other mobile or portable device transfers image data to communication server 116 via a wireless access point or router 121.

An identifier for the person whose picture is captured on a camera may be manually assigned by the person initiating the image capture. For example, a guard or staff member may associate the name (as known to the facility) or number of a resident to a picture of a resident either when the image is captured or at a later time. Alternatively, a resident identity may be automatically associated with a captured image. For example, residents may wear a label or tag with an identifier, such as a wristband with a radio frequency identification (RFID) chip or with a barcode. The RFID chip or barcode on the wristband may be scanned to identify the resident. An RFID reader 122 may be used to associate a resident identifier to images captured using any of the camera types discussed herein. For example, RFID reader 122 may detect when a resident is near a fixed-location camera 101. The resident identity detected by the RFID reader 122 may be associated with any images captured by camera 101. Alternatively, when a resident uses a fixed-location device, such as a telephone 110, video visitation terminal 113, or computer terminal 115, a nearby RFID reader 122 may detect a user identity and associate that identity with any images captured by camera 111, 112, on 114 on the device. RFID reader 122 may be a stand-alone device or may be embedded as a component of the image-capture device 110, 113, 115. Additionally, RFID reader 122 may detect both a resident identity and a mobile device identity, such as by reading a resident's wristband RFID chip and an RFID chip on a smartphone 117 or tablet 119. In other embodiments, other scanning technology, such as a barcode reader or scanner, may be used to identify a resident.

The present invention is a labor savings device in that it allows background checks to be conducted automatically without requiring law enforcement action. For example, pictures of detainees may be captured in a facility's holding cell before an intake or booking process begins. The pictures are compared to the image database and any matching images are identified. When a matching image is found, an alert may be sent notifying the facility staff that a detainee in the holding cell has been correlated to an existing record. Alternatively, instead of notifying the facility only that a detainee has an existing record, additional filters may be applied so that the facility is only notified when a detainee with active warrants or with violent prior crimes is detected.

Embodiments of the invention are not limited to facial recognition but may use any pattern recognition method. In one embodiment, a camera may be used to capture images of a detainee's tattoo, piercing, iris, or body part instead of or in addition to capturing pictures of the detainee's face. For example, the tattoo images may then be used to search databases of tattoos associated with known individuals. Similarly, an image of a piercing, iris, or body part may then be used to search databases of piercing, iris, or body parts associated with known individuals. Alternatively, voice pattern matching may be used to identify records associated with detainees. Samples of a detainee's speech may be captured and then used to search for matches against previously recorded speech samples. If a match is found for a tattoo image or speech sample, then corresponding information may be sent to the facility holding the detainee.

Although the examples above use images of detainees to find criminal background records, it will be understood that the present invention may be used to identify information about any person in a controlled-environment facility. For example, when visitors enter the controlled-environment facility, a picture of the visitors' faces may be taken—covertly or overtly—and then used to search the database of stored images. In this way, visitors who have outstanding warrants, are on parole, or have a criminal record may be identified without the need to question the visitors about such information. For inmates who participate in a video visitation or video conference session, the controlled-environment facility may also capture images of the remote party to identify the criminal background of the individuals who are communicating with residents.

The present invention may also be used to detect criminal background information associated with the staff of the controlled-environment facility. For example, when a booking officer, investigator, or other staff member uses workstation 104, camera 117 may be used to capture a picture of the staff member. That picture may then be used to determine if the staff member has any outstanding warrants or past arrests, convictions, or other criminal background. This would allow the controlled-environment facility to continually monitor the staff after an initial vetting during the hiring process.

FIG. 3 is a flowchart 300 of a method for automatically identifying records associated with residents of a controlled-environment facility. In step 301, an electronic image of a target individual is captured using a camera system in a controlled-environment facility. The target individual may be, for example, a resident of the controlled-environment facility, a visitor for a resident of the controlled-environment facility, or a staff member at the controlled-environment facility. The electronic image of the target individual may be captured as part of an intake process in the controlled-environment facility or when the target individual uses a communication or visitation terminal in the controlled-environment facility. In other embodiments, the image of the target individual may be captured at any other time at preselected or random times or when commanded by controlled-environment facility personnel.

In step 302, the electronic image of the target individual is compared to a database of stored images that are associated with individuals with known criminal records. The database of stored images may be located at the controlled-environment facility or at a remote facility. The electronic image of the target individual may be compared to the database of stored images using an application running on a processor, such as a workstation, server, or computer, located at the controlled-environment facility or at a remote facility.

In step 303, a match is identified between the electronic image and a matching stored image in the database of stored images. The electronic image of the target individual and the stored images may comprise pictures of faces that are compared using a facial recognition application. In other embodiments, the electronic image of the target individual and the stored images include pictures of tattoos, piercings, irises, or body parts that are compared using an image matching application.

In another embodiment, the electronic image of the target individual is compared to a database of stored images located at the controlled-environment facility. If no matches are found in the database of stored images located at the controlled-environment facility, then the electronic image of the target individual is compared to one or more databases of stored images located remotely from the controlled-environment facility.

In step 304, criminal record information associated with the matching stored image is identified. The criminal record information may include, for example, one or more of an active warrant, an arrest record, or a prior conviction record.

In step 305, the criminal record information is provided to personnel at the controlled-environment facility. The criminal record information may be provided on a workstation display, for example.

In step 306, the criminal record information associated with the matching stored image is compared to information in a target individual record at the controlled environment facility.

In step 307, differences between the criminal record information and the target individual record are identified.

In step 308, controlled-environment facility personnel are alerted either overtly or covertly when at least one difference is detected between the criminal record information and the target individual record. The differences may be highlighted on a display presented to the controlled-environment facility personnel. For example, if an active warrant is found in the criminal record information and is not noted in the target individual record at the controlled-environment facility, then an alert may be generated.

In some embodiments, a picture may include more than one person. For example, a camera may capture images of two more residents in a controlled-environment facility, such as when groups of residents are together in a common area, recreation area, or dining area. A facial recognition application can be used to process the images to identify individual faces. The individual faces may then be analyzed separately to attempt to match the individual faces to existing records. If a match is found for one or more of the faces in a group picture, alerts may be sent to facility personnel.

Embodiments of the present systems and methods for automatically identifying records associated with residents of a controlled-environment facility, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example process 300 described above with respect to FIG. 3, and/or a computer system such as computer system 400 may be used as, or as part of, one or more of an image server 102 or a workstation 104 (FIG. 1).

As illustrated, example computer system 400 includes one or more processors 401 coupled to a system memory 402 via an input/output (I/O) interface 403. Example computer system 400 further includes a network interface 404 coupled to I/O interface 403, and one or more input/output devices 405, such as video device(s) 406 (e.g., a camera), audio device(s) 407 (e.g., a microphone and/or a speaker), and display(s) 408. Further, RFID reader 409 may be such an input device. Computer system 400 may also include a cursor control device (e.g., a mouse or touchpad), a keyboard, etc. Multiple input/output devices 405 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 404.

In various embodiments, computer system 400 may be a single-processor system including one processor 401, or a multi-processor system including two or more processors 401 (e.g., two, four, eight, or another suitable number). Processors 401 may be any processor capable of executing program instructions. For example, in various embodiments, processors 401 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 401 may commonly, but not necessarily, implement the same ISA. Also, in some embodiments, at least one processor 401 may be a graphics processing unit (GPU) or other dedicated graphics-rendering device.

System memory 402 may be configured to store program instructions and/or data accessible by processor 401. In various embodiments, system memory 402 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, may be stored within system memory 402 as program instructions 410 and data storage 411, respectively. In other embodiments, program instructions and/or data may be received, sent or stored upon different types of computer-accessible media or on similar media separate from system memory 402 or computer system 400. Generally speaking, a computer-readable medium may include any tangible or non-transitory storage media or memory media such as magnetic or optical media—e.g., disk or CD/DVD-ROM coupled to computer system 400 via I/O interface 403, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 404.

In some embodiments, I/O interface 403 may be configured to coordinate I/O traffic between processor 401, system memory 402, and any peripheral devices in the device, including network interface 404 or other peripheral interfaces, such as input/output devices 405. In some embodiments, I/O interface 403 may perform any suitable protocol, timing or other data transformations to convert data signals from one component (e.g., system memory 402) into a format usable by another component (e.g., processor 401). In some embodiments, I/O interface 403 may include support for devices attached through various types of peripheral buses, such as a variant of the Peripheral Component Interconnect (PCI) bus standard or the Universal Serial Bus (USB) standard, for example. In some embodiments, the function of I/O interface 403 may be split into two or more separate components, such as a north bridge and a south bridge, for example. In addition, in some embodiments, some or all of the functionality of I/O interface 403, such as an interface to system memory 402, may be incorporated into processor 401.

Network interface 404 may be configured to allow data to be exchanged between computer system 400 and other devices attached to a network, such as other computer systems, or between nodes of computer system 400. In various embodiments, network interface 404 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 402 may include program instructions 410, configured to implement certain embodiments described herein, and data storage 411, comprising various data accessible by program instructions 410. In an embodiment, program instructions 410 may include software elements corresponding to one or more of the various embodiments illustrated in the above figures. For example, program instructions 410 may be implemented in various embodiments using any desired programming language, scripting language, or combination of programming languages and/or scripting languages (e.g., C, C++, C #, JAVA®, JAVASCRIPT®, ANGULAR JS®, PERL®, etc.). Data storage 411 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   capturing an electronic speech sample of a target individual in a controlled-environment facility;
   comparing the electronic speech sample of the target individual to a database of stored electronic speech samples that are associated with individuals with known criminal records using voice pattern matching;
   identifying a match between the electronic speech sample and a matching stored electronic speech sample using voice pattern matching;
   identifying criminal record information associated with the matching stored electronic speech sample;
   providing the criminal record information to a user associated with the controlled-environment facility on a display presented to the user;
   comparing the criminal record information associated with the matching stored electronic speech sample to a controlled-environment facility record for the target individual;
   determining if there are differences between the criminal record information and the controlled-environment facility record for the target individual; and
   alerting controlled-environment facility personnel when at least one difference is detected between the criminal record information and the controlled-environment facility record for the target individual.

2. The method of claim 1, wherein the electronic speech sample of the target individual is captured as part of an intake process in the controlled-environment facility.

3. The method of claim 1, wherein the electronic speech sample is captured when the target individual uses a communication or visitation terminal in the controlled-environment facility.

4. The method of claim 1, wherein the target individual is a resident of the controlled-environment facility.

5. The method of claim 1, wherein the target individual is a visitor for a resident of the controlled-environment facility.

6. The method of claim 1, wherein the target individual is a staff member of the controlled-environment facility.

7. The method of claim 1, wherein the criminal record information includes one or more of: an active warrant, an arrest record, and a prior conviction record.

8. The method of claim 1, wherein the database of stored speech samples is located remotely from the controlled-environment facility.

9. The method of claim 1, wherein the database of stored speech samples is located at the controlled-environment facility.

10. The method of claim 1, wherein the electronic speech sample of the target individual is compared to the database of stored electronic speech samples using an application running on a processor located at the controlled-environment facility.

11. The method of claim 1, wherein the electronic speech sample of the target individual is compared to the database of stored electronic speech samples using an application running on a processor located remote from the controlled-environment facility.

12. The method of claim 1, further comprising highlighting the differences between the criminal record information and the controlled-environment facility record for the target individual on the display presented to the user.

13. The method of claim 1, further comprising:
identifying at least one active warrant in the criminal record information associated with the matching stored electronic speech sample to a target individual record; and
alerting controlled-environment facility personnel when the at least one warrant is detected.

14. The method of claim 1, wherein comparing the electronic speech sample of the target individual to a database of stored electronic speech samples further comprises:
comparing the electronic speech sample of the target individual to a database of stored electronic speech samples located at the controlled-environment facility; and
if no matches are found in the database of stored electronic speech samples located at the controlled-environment facility, then comparing the electronic speech sample of the target individual to one or more databases of stored electronic speech samples located remotely from the controlled-environment facility.

15. A system for automatically identifying records associated with residents of a controlled-environment facility, comprising:
at least one microphone configured to capture electronic speech samples of residents of a controlled-environment facility;
at least one memory storing electronic speech samples that are associated with individuals with known criminal records;
a computer system associated with the controlled-environment facility comprising a processor executing a voice pattern matching application configured to:
identify a match between the electronic speech samples of the residents and one or more stored electronic speech samples using voice pattern matching;
compare criminal record information associated with a matching stored electronic speech sample to a controlled-environment facility record for the matching resident;
determine if there are any differences between the criminal record information and the controlled-environment facility record for the matching resident; and
alerting controlled-environment facility personnel when at least one difference is detected between the criminal record information and the controlled-environment facility record for the matching resident; and
a display configured to display criminal record information associated with the matching resident to controlled-environment facility personnel.

16. The system of claim 15, wherein the electronic speech samples of the residents are captured as part of an intake process in the controlled-environment facility.

17. The system of claim 15, wherein the criminal record information includes one or more of: an active warrant, an arrest record, and a prior conviction record.

18. The system of claim 15, wherein the at least one memory storing electronic speech samples is located remotely from the controlled-environment facility.

19. A non-transitory computer-readable storage medium having program instructions stored thereon that, upon execution by one or more computer systems associated with controlled-environment facility, cause the one or more computer systems associated with controlled-environment facility to:
capture an electronic speech sample of a target individual in a controlled-environment facility;
compare the electronic speech sample of the target individual to a database of stored electronic speech samples that are associated with individuals with known criminal records using voice pattern matching;
identify a match between the electronic speech sample and a matching stored electronic speech sample using voice pattern matching;
identify criminal record information associated with the matching stored electronic speech sample;
identify at least one active warrant in the criminal record information associated with the matching stored electronic speech sample to a target individual record;
provide the criminal record information to personnel associated with the controlled-environment facility; and
alert controlled-environment facility personnel when the at least one active warrant is detected.

\* \* \* \* \*